US006530759B2

(12) United States Patent
Sano et al.

(10) Patent No.: US 6,530,759 B2
(45) Date of Patent: Mar. 11, 2003

(54) RECIPROCATING PLUNGER PUMP WITH SEAL MOUNTING SUPPORT

(75) Inventors: Masaaki Sano, Nagoya (JP); Kazuhiro Asayama, Nagoya (JP); Hiroshi Inoue, Chiryu (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 09/836,774

(22) Filed: Apr. 18, 2001

(65) Prior Publication Data

US 2001/0043874 A1 Nov. 22, 2001

(30) Foreign Application Priority Data

Apr. 18, 2000 (JP) ....................................... 2000-116423

(51) Int. Cl.[7] .......................... F04B 19/00; F04B 53/00; F04B 39/10; F16J 15/18; B60T 11/236

(52) U.S. Cl. .................... 417/470; 417/555.1; 417/505; 417/559; 92/168; 277/436; 277/437

(58) Field of Search ............................. 417/470, 555.1, 417/505, 559; 92/168; 277/436, 437, 438, 459, 451

(56) References Cited

U.S. PATENT DOCUMENTS

| | | | | | |
|---|---|---|---|---|---|
| 2,804,050 | A | * | 8/1957 | Spilling | 277/500 |
| 3,373,695 | A | * | 3/1968 | Yohpe | 417/454 |
| 3,438,638 | A | * | 4/1969 | Newcomb et al. | 277/422 |
| 3,503,304 | A | * | 3/1970 | Comeau, Jr. et al. | 60/670 |
| 3,902,404 | A | * | 9/1975 | Breit | 277/411 |
| 4,508,020 | A | * | 4/1985 | Szcupak | 188/322.17 |
| 4,832,352 | A | * | 5/1989 | Sjostedt | 277/114 |
| 5,567,134 | A | * | 10/1996 | Inoue | 417/490 |
| 5,890,415 | A | * | 4/1999 | Asou | 417/470 |

* cited by examiner

*Primary Examiner*—Charles G. Freay
*Assistant Examiner*—Timothy P. Solak
(74) *Attorney, Agent, or Firm*—Kenyon & Kenyon

(57) ABSTRACT

A high pressure fuel pump has a plunger that extends through a cylinder and is reciprocally located in a pressurizing chamber. The plunger is reciprocated by a lifter and changes the volume of the pressurizing chamber to pressurize fuel in the pressurizing chamber. A seal member seals the cylinder from the lifter to prevent fuel that leaks from the pressurizing chamber from being mixed with lubricant that lubricates the lifter. A support to which the seal member is attached is formed separately from the cylinder. The support is fixed to the cylinder with the plunger extending through the support.

29 Claims, 3 Drawing Sheets

RECIPROCATING PLUNGER PUMP WITH SEAL MOUNTING SUPPORT

BACKGROUND OF THE INVENTION

The present invention relates to a high pressure pump such as a high pressure fuel pump that supplies fuel to the fuel injector of a vehicle internal combustion engine.

Japanese Unexamined Patent Publication No. 8-68370 discloses a high pressure pump, which is illustrated in FIG. 4.

As shown in FIG. 4, a cylinder 41 accommodates a plunger 42. The plunger 42 extends through a plunger hole 41*b* formed in the cylinder 41 and is reciprocated by a lifter 43. Reciprocation of the plunger 42 changes the volume of a pressurizing chamber (not show), which is defined in the cylinder 41. Accordingly, fuel is pressurized.

A seal member 44 is located about the lower portion of the cylinder 41 to seal the space between the cylinder 41 and the lifter 43. Specifically, a protrusion 41*a* is formed in the lower portion of the cylinder 41. The protrusion 41*a* is press fitted into the upper opening of the seal member 44. An annular lip portion 44*a* is formed in the lower portion of the seal member 44. The plunger 42 extends through and slides on the lip portion 44*a*. Thus, fuel that leaks from the pressurizing chamber is prevented from being mixed with lubricant that lubricates the lifter 43.

However, since the protrusion 41*a* of the cylinder 41 is press fitted into the upper opening of the seal member 44, the cylinder 41 receives load due to the elastic force of the seal member 44, which may deform the plunger hole 41*b*.

The axes of the seal member 44 and the plunger 42 must be aligned with a high precision to guarantee a high sealing characteristic, which increases the cost of the cylinder 41.

BRIEF SUMMARY OF THE INVENTION

Accordingly, it is an objective of the present invention to provide a high pressure pump the seal member of which is reliably installed and positioned outside of a cylinder.

To achieve the foregoing and other objectives and in accordance with the purpose of the present invention, a high pressure pump is provided. A plunger is reciprocally located in a pressurizing chamber that is formed in a cylinder. The plunger is reciprocated by a driving member and changes the volume of the pressurizing chamber thereby pressurizing fluid in the pressurizing chamber. The pump includes a seal member and a support. The seal member is located outside of the cylinder and seals the cylinder from the driving member thereby preventing fluid that leaks from the pressurizing chamber from being mixed with lubricant that lubricates the driving member. The support is formed separately from the cylinder and the seal member is attached to the support. The support is fixed to the cylinder with the plunger extending through the support.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWING

The invention, together with objects and advantages thereof, may best be understood by reference to the following description of the presently preferred embodiments together with the accompanying drawings in which.

DETAILED DESCRIPTION OF THE PREFERRED EMBODIMENTS

A high pressure fuel pump 11 according to a first embodiment of the present invention will now be described with reference to FIGS. 1 and 2. The pump 11 is used in a cylinder injection type engine. The pump 11 pressurizes fuel supplied from a fuel tank by a feed pump and sends the fuel to a fuel distribution pipe.

Figure 1:
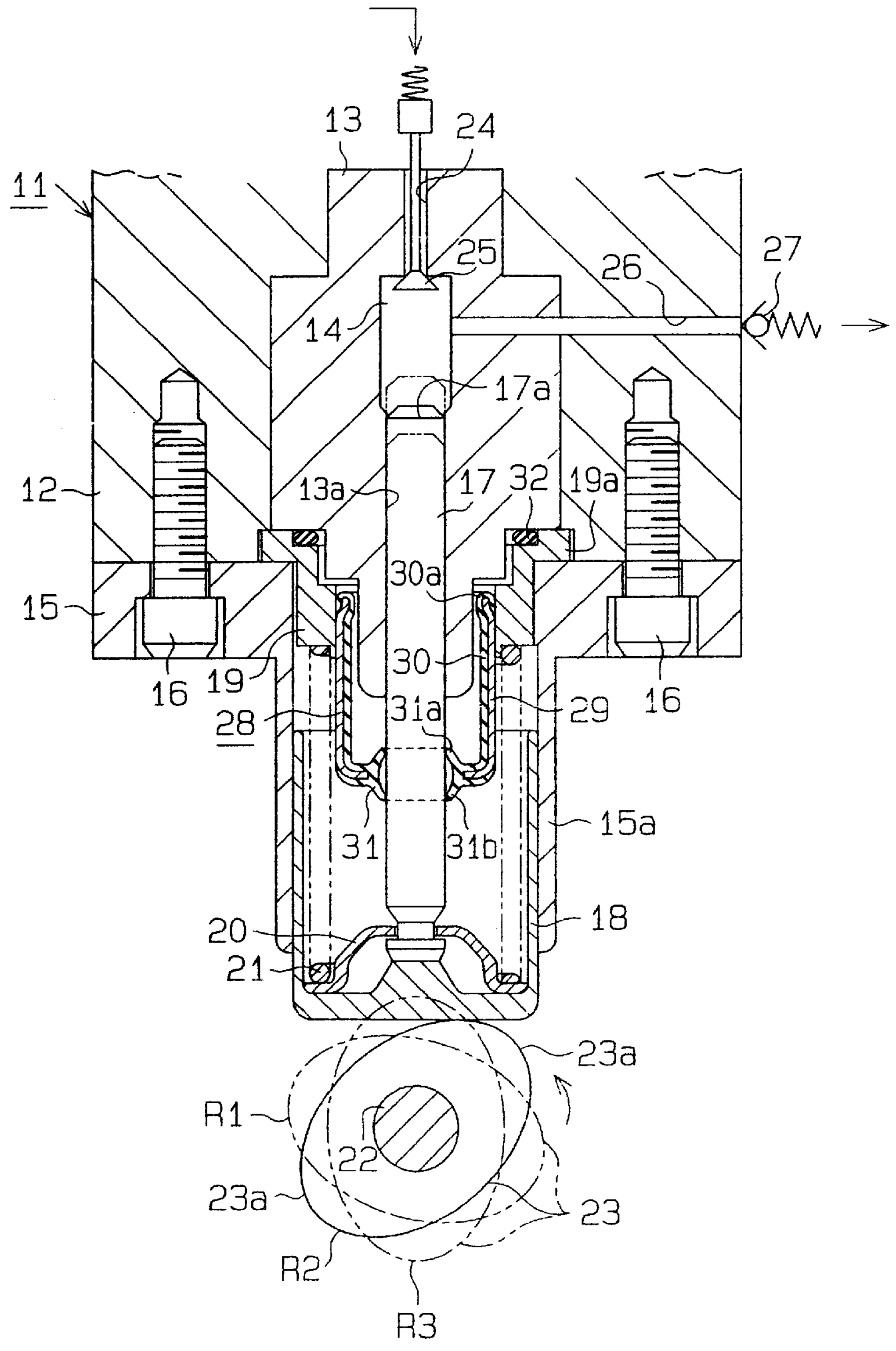
FIG. 1 is a cross-sectional view illustrating a high pressure fuel pump according to a first embodiment of the present invention.

As shown in FIG. 1, a cylinder 13 is located in a housing 12. A pressurizing chamber 14 is defined in the upper portion of the cylinder 13. A bracket 15 is secured to the lower end of the housing 12 by bolts 16. The cylinder 13 is held between the bracket 15 and the housing 12. A plunger hole 13*a* is formed in the center of the cylinder 13. A plunger 17 extends through the plunger hole 13*a* and slides in the axial direction.

The bracket 15 includes a cylindrical guide 15*a*, which protrudes downward. A driving member, which is a cup shaped lifter 18 in this embodiment, is fitted in the guide 15*a*. The lifter 18 slides in the axial direction. The lower end of the plunger 17 contacts the bottom of the lifter 18. A support 19, which also functions as a spring seat, surrounds the circumference of the lower portion of the cylinder 13. The support 19 has a flange 19*a* at its upper end. The flange 19*a*, together with the cylinder 13, is tightly held between the housing 12 and the bracket 15.

A retainer 20 is fitted about the lower end of the plunger 17. The retainer 20 is coaxial with the support 19. A spring 21 extends between the support 19 and the retainer 20 in a compressed state and presses the lower end of the plunger 17 against the bottom of the lifter 18. Accordingly, the lifter 18 is urged toward an engine camshaft 22.

An exhaust cam is fixed to the camshaft 22. Also, a drive cam 23 is fixed to the camshaft 22 to actuate the plunger 17. Two cam noses 23*a* are formed on the cam surface of the drive cam 23. The cam noses 23*a* are spaced apart by one hundred and eighty degrees. The spring 21 presses the lifter 18 against the cam surface of the drive cam 23.

A fuel supply passage 24, which is formed in the cylinder 13, is connected to the pressurizing chamber 14. An electromagnetic spill valve 25 is located in the passage 24.

The spill valve 25 includes an electromagnetic solenoid. When no voltage is applied to the solenoid, the spill valve 25 is open and communicates the supply passage 24 with the pressurizing chamber 14. When the plunger 17 is lowered in this state, fuel that is drawn by a feed pump (not shown) from the fuel tank is sent to the pressurizing chamber 14 through the supply passage 24. At this time, fuel is not pressurized. When voltage is applied to the solenoid, the spill valve 25 is closed, which shuts the supply passage 24. When the plunger 17 is raised in this state, the volume of the pressurizing chamber 14 is reduced, which pressurizes fuel in the pressurizing chamber 14.

A discharge passage, which is a high pressure passage 26, in this embodiment, is formed in the cylinder 13 and the housing 12. The high pressure passage 26 is connected to the pressurizing chamber 14. A check valve 27 is located at the outlet of the high pressure passage 26. When the pressure of fuel that is discharged from the pressurizing chamber 14 through the high pressure passage 26 exceeds a predetermined level, the check valve 27 is opened. Then, high pressure fuel is sent to the fuel distribution pipe. Subsequently, the fuel is distributed to the fuel injectors of the engine.

When the engine is running, the camshaft 22 rotates, which rotates the drive cam 23. Accordingly, the lifter 18 reciprocates in the axial direction of the guide 15*a* in accordance with the profile of the cam surface of the drive cam 23. When the drive cam 23 is at a first position R1, which is shown by broken line in FIG. 1, the lifter 18 is at the lowest position and is closest to the camshaft 22. At this time, the plunger 17 is at the lowest position. In this state, the upper end 17*a* of the plunger 17 is most retracted from the pressurizing chamber 14, which maximizes the volume of the pressurizing chamber 14.

When the drive cam 23 is rotated counterclockwise and reaches a second position R2 shown in FIG. 1, one of the cam noses 23*a* approaches the bottom of the lifter 18, which raises the lifter 18. The plunger 17 is raised, accordingly, and the upper end 17*a* is moved to project into the pressurizing chamber 14. The volume of the pressurizing chamber 14 is decreased, accordingly.

When the drive cam 23 is rotated to a third position R3, one of the cam noses 23*a* is at the highest position. In this state, the upper end 17*a* of the plunger 17 is at the highest position and protrudes maximally into the pressurizing chamber 14, which minimizes the volume of the pressurizing chamber 14. Rotation of the drive cam 23 from the first position R1 to the third position R3 corresponds to the pressurizing stroke of the plunger 17.

If no voltage is applied to the solenoid of the spill valve 25 during the pressurizing stroke, fuel in the pressurizing chamber is spilled to the fuel tank through the supply passage 24 and is not sent to the fuel distribution pipe. If voltage is applied to the solenoid at appropriate timing based on control of an electronic controller, the spill valve 25 is closed. When the spill valve 25 is closed, the pressure of fuel in the pressurizing chamber 14 is increased as the plunger 17 is raised. Then, the pressurized fuel in the pressurizing chamber 14 is sent to the check valve 27 through the high pressure passage 26 and opens the check valve 27. The fuel is then supplied to the fuel distribution pipe. The displacement of the high pressure fuel pump 11 is controlled by changing the closing timing of the spill valve 25 during the pressurizing stroke of the plunger 17.

When the drive cam 23 is rotated counterclockwise from the third position R3, the lifter 18 and the plunger 17 are gradually lowered by the force of the spring 21. When the drive cam 23 reaches the first position R1, the lifter 18 and the plunger 17 are again at the lowest position. The rotation of the drive cam 23 from the third position R3 to the first position R1 corresponds to a suction stroke of the plunger 17.

The electronic controller stops applying voltage to the solenoid when the lifter 18 and the plunger 17 reach the highest positions. During the suction stroke, the spill valve 25 is opened, which permits fuel pumped by the feed pump from the fuel tank to be drawn into the pressurizing chamber 14 through the fuel supply passage 24.

Thereafter, the pressurizing stroke and the suction stroke are alternately repeated. Accordingly, fuel is supplied to the fuel distribution pipe through the high pressure passage 26. The displacement of the pump 11 is controlled by changing the opening and closing timing of the spill valve 25.

Figure 2:
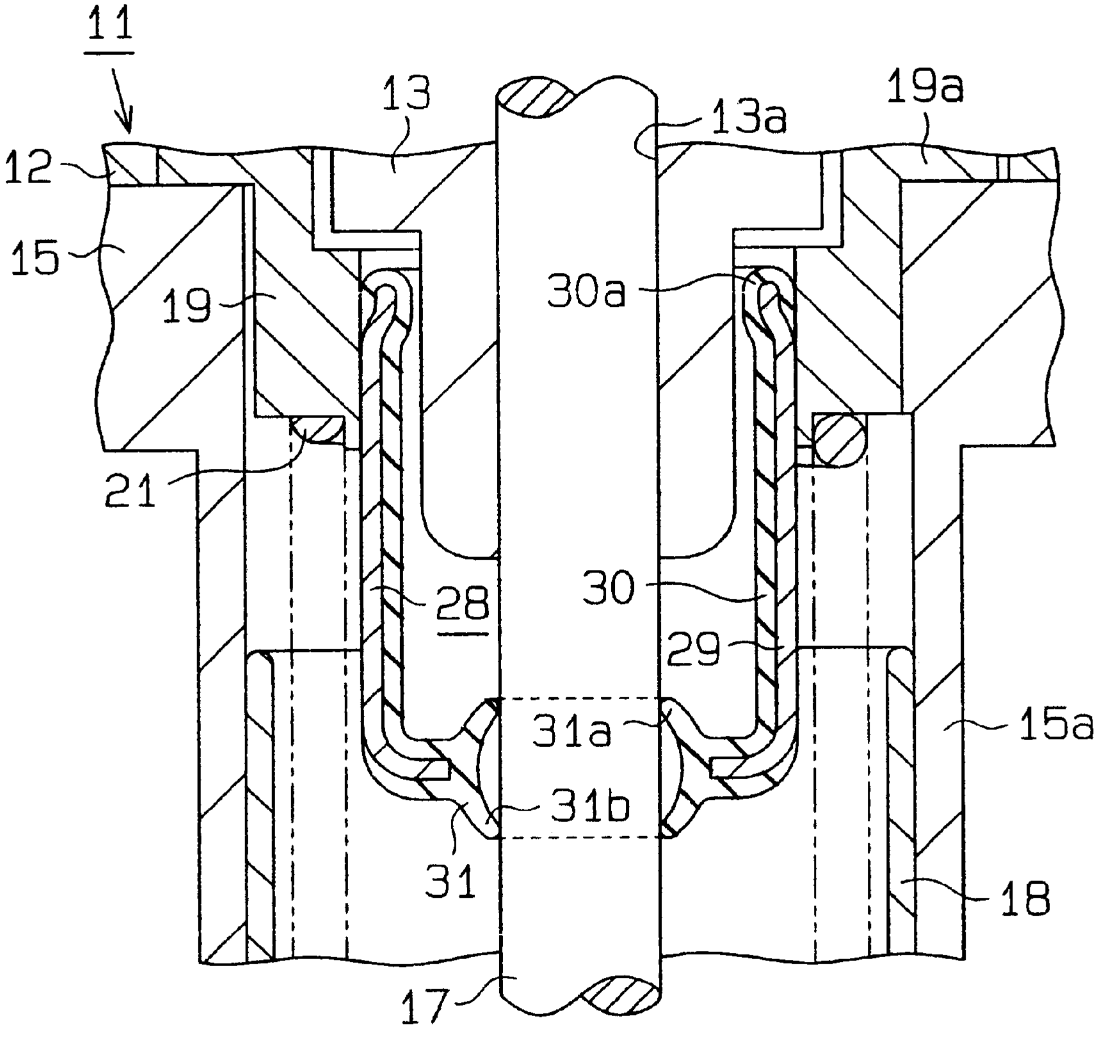
FIG. 2 is an enlarged partial cross-sectional view illustrating the pump of FIG. 1.

As shown in FIGS. 1 and 2, a seal member 28 is located at the lower end portion of the cylinder 13. The seal member 28 seals the space between the cylinder 13 and the lifter 18, which prevents fuel that leaks from the pressurizing chamber 14 through the clearance between the plunger hole 13*a* and the plunger 17 from being mixed with lubricant that lubricates the lifter 18.

The seal member 28 includes a metal tube 29 and a rubber piece 30, which covers the inner surface of the tube 29. An outward folded portion 30*a* is formed at the upper end of the rubber piece 30. An annular lip portion 31 is formed at the lower end of the rubber piece 30. The lip portion 31 includes an upper lip 31*a* and a lower lip 31*b*, which are spaced apart in the axial direction of the plunger 17.

The upper end of the metal tube 29 is not directly fitted about the lower end of the cylinder 13. Instead, the tube 29 is fitted into the annular support 19, which is formed separately from the cylinder 13. When the pump 11 is assembled, the support 19 is first engaged with the plunger 17. Then, together with the cylinder 13, the support 19 is tightly held between the housing 12 and the bracket 15. Accordingly, the seal member 28 is installed at the lower end portion of the cylinder 13. An O-ring 32 is located between the flange 19*a* and the cylinder 13.

The lip portion 31 slidably contacts the plunger 17. Therefore, when the plunger 17 is axially reciprocated by the lifter 18 in accordance with rotation of the drive cam 23, fuel that leaks from the pressurizing chamber 14 along the surface of the plunger 17 is prevented from being mixed with lubricant in the lifter 18. In other words, fuel and lubricant on the plunger 17 are wiped by the lips 31*a*, 31*b*, which prevents fuel and lubricant from being mixed with each other.

The folded portion 30*a* of the rubber piece 30 contacts the inner surface of the support 19. Therefore, even if the shape of the upper portion of the tube 29 does not accurately correspond to the shape of the corresponding part of the support 19, the folded portion 30*a* reliably prevents fuel from leaking. Further, the O-ring 32, which is located between the flange 19*a* of the cylinder 13, prevents fuel from leaking between the cylinder 13 and the support 19.

The embodiment of FIGS. 1 and 2 has the following advantages.

(1) The plunger 17, which is reciprocally fitted in the cylinder 13, is actuated by the lifter 18. When reciprocated, the plunger 17 changes the volume of the pressurizing chamber 14, which pressurizes fuel. A seal member 28 is located outside of the cylinder 13 to seal between the cylinder 13 and the lifter 18. The seal member 28 prevents fuel that leaks from the pressurizing chamber 14 from being mixed with lubricant that lubricates the lifter 18. The seal member 28 is engaged with the support 19, which is formed separately from the cylinder 13. The support 19 surrounds the plunger 17 and is pressed against the cylinder 13, which installs the seal member 28 outside of the cylinder 13. The seal member 28 is first engaged with the support 19. Then, the support 19 is engaged with the plunger 17 and installed. In other words, the seal member 28 is installed without applying load to the cylinder 13. Therefore, unlike the prior art structure, the plunger hole 13*a* of the cylinder 13 is not deformed due to the load that is applied to the cylinder 13 due to the elastic force the seal member 28.

(2) When the support 19, to which the seal member 28 is attached, is fixed to the cylinder 13, the radial position of the support 19 relative to the cylinder 13 can be adjusted, which facilitates the alignment of the axes of the seal member 28 and the plunger 17. In the prior art structure, the axis of the protrusion formed on the cylinder to receive the seal member must be accurately aligned with the axis of the plunger hole. Compared to the prior art, the axis of the cylinder 13 need not be accurately aligned with the axis of the plunger hole 13*a*. This facilitates the machining of the cylinder 13.

(3) The seal member 28 includes the metal tube 29 and a rubber piece 30, which covers the inner surface of the tube 29. Therefore, the tube 29 does not directly contact fuel that leaks from the pressurizing chamber 14. Thus, when substandard fuel such as fuel containing water is used, the metal tube 29 is prevented from rusting.

(4) The support 19, to which the seal member 28 is attached, functions as a spring seat that receives the spring 21, which presses the plunger 17 against the lifter 18. Therefore, there is no need for an extra spring seat, which simplifies the structure.

A second embodiment of the present invention will now be described with reference to FIG. 3. The difference from the embodiment of FIGS. 1 and 2 will mainly be discussed below.

Figure 3:
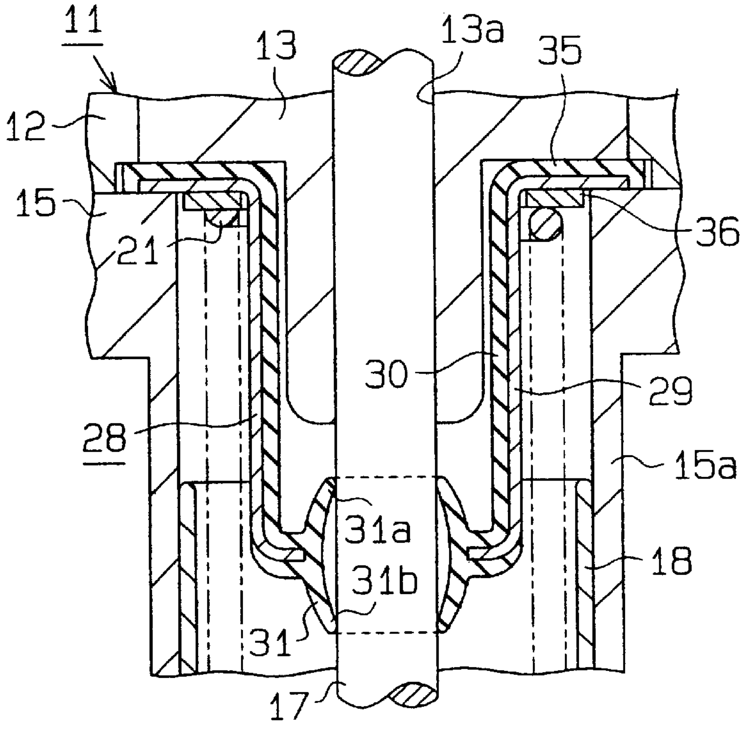
FIG. 3 is an enlarged partial cross-sectional view illustrating a high pressure fuel pump according to a second embodiment of the present invention.
Figure 4:
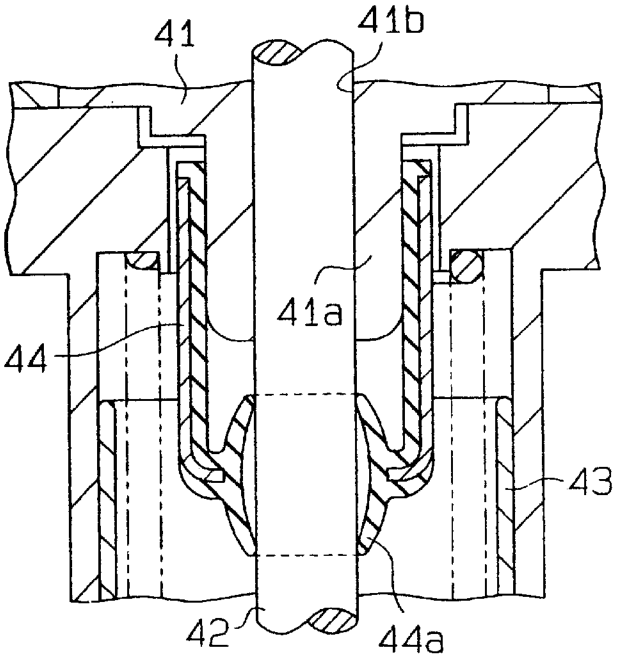
Fig.4 (Prior Art)
FIG. 4 is an enlarged partial cross-sectional view illustrating a prior art high pressure fuel pump.

In the embodiment of FIG. 3, a flange 35 is formed at the upper circumference of the seal member 28. The flange 35, together with the cylinder 13, is tightly held between the housing 12 and the bracket 15 to position the seal member 28 at the lower end of the cylinder 13. Also, an annular spring seat 36 is located on the lower surface of the flange 35. The spring seat 36 receives the upper end of the spring 21.

In addition to advantages and (3) of the embodiment shown in FIGS. 1 and 2, the embodiment of FIG. 3 has the following advantages.

(5) The position of the seal member 28 is determined by fastening the flange 35 between the bracket 15 and the housing 12. In other words, the seal member 28 is installed without applying load to the cylinder 13. Therefore, like advantage (1) of the first embodiment, the plunger hole 13*a* of the cylinder 13 is not deformed by load due to the elastic force of the seal member 28.

(6) When fixing the flange 35, which is a part of the seal member 28, to the cylinder 13, the radial position of the flange 35 relative to the cylinder 13 can be adjusted, which facilitates the alignment of the axes of the seal member 28 and the plunger 17. Therefore, like advantage (2) of the first embodiment, machining of the cylinder 13 is facilitated and the cost is reduced, accordingly.

The illustrated embodiment may be modified as follows. The following embodiments have the same or similar advantages as those of the illustrated embodiments.

In the embodiment of FIGS. 1 and 2, the support 19 need not function as a spring seat for receiving the spring 21, and a separate spring seat may be used.

Each high pressure pump 11 of the illustrated embodiments has the electromagnetic spill valve 25, and the closing timing of the spill valve 25 is adjusted during the pressurizing stroke to control the displacement of the pump 11. However, the present invention may be applied to other types of high pressure pumps. For example, the present invention may be applied to a high pressure pump that changes the displacement by adjusting the opening timing of an electromagnetic valve during suction stroke to control the amount of fuel that is drawn to a pressurizing chamber.

The present invention may be applied to a high pressure pump that compresses fluid other than fuel.

Therefore, the present examples and embodiments are to be considered as illustrative and not restrictive and the invention is not to be limited to the details given herein, but may be modified within the scope and equivalence of the appended claims.

What is claimed is:

1. A high pressure pump, wherein a plunger is reciprocally located in a pressurizing chamber that is formed in a cylinder, wherein the plunger is reciprocated by a driving member and changes the volume of the pressurizing chamber thereby pressurizing fuel in the pressurizing chamber, the pump comprising:

a seal member that is located outside of the cylinder, wherein the seal member includes a tube, a flange connected to the tube, a rubber piece that covers the inner surface of the tube and the surface of the flange that is continued to the inner surface of the tube, and a pair of spaced lips connected to the rubber piece, wherein the tube and the flange are made of metal, wherein the lips contact the surface of the plunger, wherein the seal member seals the cylinder from the driving member thereby preventing fuel that leaks from the pressurizing chamber from being mixed with lubricant that lubricates the driving member; and a bracket that clamps the flange of the seal member between the bracket and the cylinder.

2. The high pressure pump according to claim 1, wherein the seal member is accommodated within a space formed between the cylinder and the driving member.

3. The high pressure pump according to claim 1, further comprising a supply passage to supply fluid to the pressurizing chamber and a discharge passage to discharge fluid from the pressurizing chamber.

4. The high pressure pump according to claim 3, wherein a spill valve is located in the pressurizing chamber, and wherein the spill valve selectively opens and closes the supply passage.

5. The high pressure pump according to claim 3, wherein a check valve is located in the discharge passage, and wherein the check valve selectively opens and closes the discharge passage.

6. The high pressure pump according to claim 1, wherein the driving member is reciprocally supported by the bracket and is coupled to the plunger.

7. The high pressure pump according to claim 1, further comprising a cam for reciprocating the driving member and a spring for pressing the driving member against the cam.

8. A high pressure pump, wherein a plunger is reciprocally located in a pressurizing chamber that is formed in a cylinder, wherein the plunger is reciprocated by a driving member and changes the volume of the pressurizing chamber thereby pressurizing fluid in the pressurizing chamber, the pump comprising:

a seal member that is located outside of the cylinder, wherein the seal member seals the cylinder from the driving member thereby preventing fluid that leaks from the pressurizing chamber from being mixed with lubricant that lubricates the driving member;

a support that is formed separately from the cylinder, wherein the seal member is attached to the support; and a bracket that fixes the cylinder to the support, wherein the support is fixed to the cylinder with the plunger extending through the support, and wherein the support is fixed to the cylinder with the support held between the bracket and the cylinder.

9. The high pressure pump according to claim 8, wherein the seal member includes a metal tube and a rubber piece that covers the inner surface of the tube, and wherein the seal member is attached to the support by press fitting the tube into the support.

10. The high pressure pump according to claim 9, wherein the support is annular and has a flange, and wherein the support is fixed to the cylinder with the flange held between the bracket and the cylinder.

11. The high pressure pump according to claim 10, wherein the seal member includes a pair of spaced lips, and wherein the lips contact the surface of the plunger.

12. The high pressure pump according to claim 8, further comprising a supply passage to supply fluid to the pressurizing chamber and a discharge passage to discharge fluid from the pressurizing chamber.

13. The high pressure pump according to claim 12, wherein a spill valve is located in the pressurizing chamber, and wherein the spill valve selectively opens and closes the supply passage.

14. The high pressure pump according to claim 12, wherein a check valve is located in the discharge passage, and wherein the check valve selectively opens and closes the discharge passage.

15. The high pressure pump according to claim 8, wherein the driving member is a lifter, and wherein the lifter is reciprocally supported by the bracket and is coupled to the plunger.

16. The high pressure pump according to claim 8, further comprising a cam for reciprocating the lifter and a spring for pressing the lifter against the cam.

17. The high pressure pump according to claim 8, wherein the seal member is accommodated within a space formed between the cylinder and the driving member.

18. The high pressure pump according to claim 8, wherein the seal member has an axial section that extends along an axial direction of the plunger and a radial section that extends along a radial direction of the plunger, wherein the axial section contacts the support and the radial section contacts the plunger.

19. The high pressure pump according to claim 18, wherein the cylinder has a projecting section that projects opposite to the pressurizing chamber, wherein the axial section is located between the outer surface of the projecting section and the inner surface of the support.

20. A high pressure pump, wherein a plunger is reciprocally located in a pressurizing chamber that is formed in a cylinder, wherein the plunger is reciprocated by a lifter and changes the volume of the pressurizing chamber thereby pressurizing fuel in the pressurizing chamber, the pump comprising:

a support that is formed separately from the cylinder;

a seal member that is located outside of the cylinder and is attached to the support, wherein the seal member includes a metal tube, a rubber piece that covers the inner surface of the tube and a pair of spaced lips, wherein the lips contact the surface of the plunger, wherein the seal member is attached to the support by press fitting the tube into the support, wherein the seal member seals the cylinder from the lifter thereby preventing fuel that leaks from the pressurizing chamber from being mixed with lubricant that lubricates the lifter; and a bracket that fixes the cylinder to the support, wherein the support is fixed to the cylinder with the plunger extending through the support, and wherein the support is fixed to the cylinder with the support held between the bracket and the cylinder.

21. The high pressure pump according to claim 20, wherein the support is annular and has a flange, and wherein the support is fixed to the cylinder with the flange held between the bracket and the cylinder.

22. The high pressure pump according to claim 21, wherein the lifter is reciprocally supported by the bracket and is coupled to the plunger.

23. The high pressure pump according to claim 22, further comprising a cam for reciprocating the lifter and a spring for pressing the lifter against the cam.

24. The high pressure pump according to claim 20, further comprising a supply passage to supply fluid to the pressurizing chamber and a discharge passage to discharge fluid from the pressurizing chamber.

25. The high pressure pump according to claim 24, wherein a spill valve is located in the pressurizing chamber, and wherein the spill valve selectively opens and closes the supply passage.

26. The high pressure pump according to claim 24, wherein a check valve is located in the discharge passage, and wherein the check valve selectively opens and closes the discharge passage.

27. The high pressure pump according to claim 20, wherein the seal member is accommodated within a space formed between the cylinder and the lifter.

28. The high pressure pump according to claim 20, wherein the seal member has an axial section that extends along an axial direction of the plunger and a radial section that extends along a radial direction of the plunger, wherein the axial section contacts the support and the radial section contacts the plunger.

29. The high pressure pump according to claim 28, wherein the cylinder has a projecting section that projects opposite to the pressurizing chamber, wherein the axial section is located between the outer surface of the projecting section and the inner surface of the support.

* * * * *